United States Patent [19]

Furst

[11] 3,802,645

[45] Apr. 9, 1974

[54] TAPE TRANSPORT APPARATUS AND SELECTIVE DRIVING MEANS

[75] Inventor: Marcel Furst, Sunnyvale, Calif.

[73] Assignee: Newell Industries Inc., Sunnyvale, Calif.

[22] Filed: Oct. 30, 1972

[21] Appl. No.: 301,971

[52] U.S. Cl. .................. 242/192, 226/176, 226/188, 242/208, 274/4 D

[51] Int. Cl. ... G03b 1/04, G11b 15/32, B65h 17/22

[58] Field of Search .................... 242/192, 197, 210; 226/176, 178, 188; 274/4 D, 11 D

[56] References Cited

UNITED STATES PATENTS

| | | | |
|---|---|---|---|
| 3,602,415 | 8/1971 | Gross | 226/188 |
| 3,526,371 | 9/1970 | Blackie et al. | 242/192 |
| 3,552,680 | 1/1971 | Newell | 242/192 |

*Primary Examiner*—Leonard D. Christian
*Attorney, Agent, or Firm*—Flehr, Hohbach, Test, Albritton & Herbert

[57] ABSTRACT

A tape transport apparatus of a type employing an elongate pliable record tape wrapped to form supply and take-up rolls and a capstan engaging the tape to feed tape from one roll to the other and return employs a rotating flywheel for driving the capstan and means for selectively coupling the flywheel in driving relation to the capstan to feed tape at different speeds in one direction. Means are also employed for selectively decoupling the flywheel from the capstan to remove the momentum of the flywheel from the system for rapid deceleration of the tape.

6 Claims, 7 Drawing Figures

FIG_5
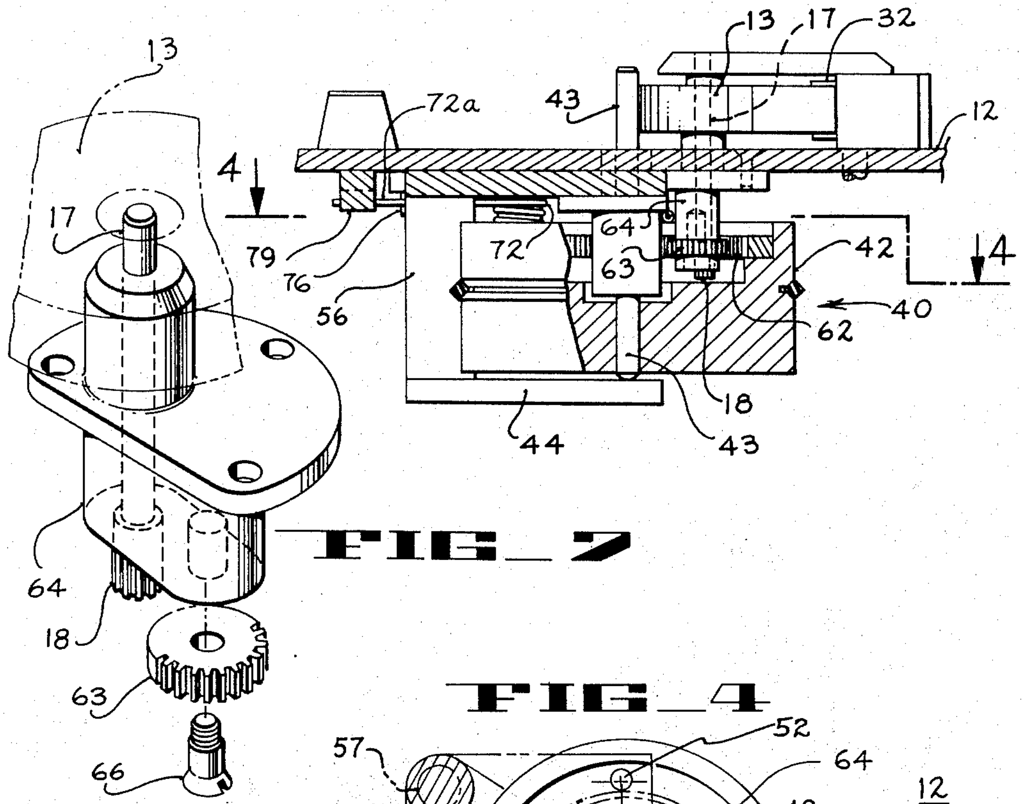
FIG. 5, FIG. 7
FIG_4
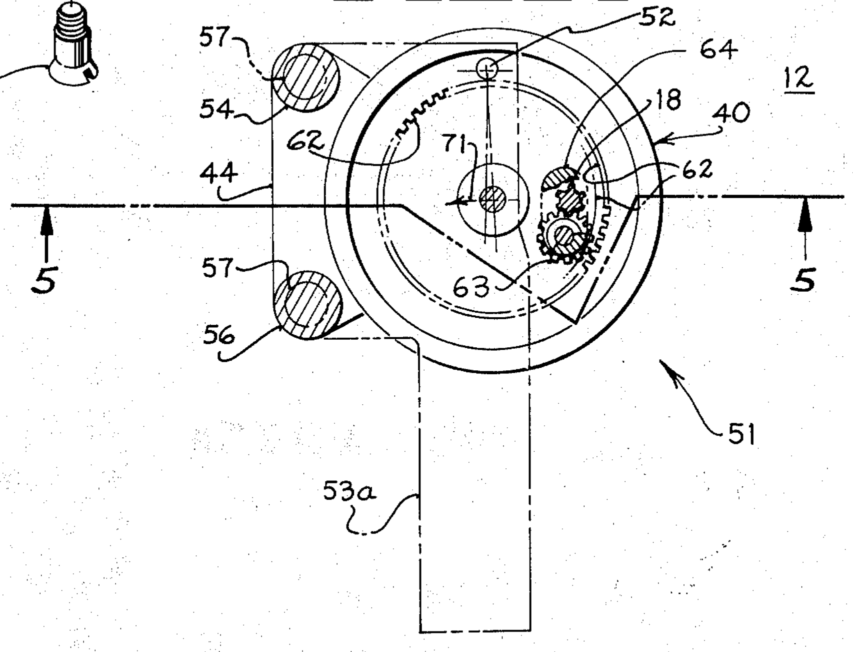

TAPE TRANSPORT APPARATUS AND SELECTIVE DRIVING MEANS

BACKGROUND OF THE INVENTION

This invention pertains to tape transport apparatus and is particularly useful in conjunction with tape transport apparatus of a type wherein the rolls of tape ride against a resilient rotating annular body for driving both the supply and take-up rolls.

As disclosed herein, a tape is fed at very predictable, stable speeds from a supply roll to a take-up roll and reverse. Being able to know and rely upon the tape speed has numerous advantages as is known. Thus, in some transports, tape is fed by pulling it using a drive coupled to the take-up roll. This mode of operation tends to provide unreliable tape speed due to factors such as constantly changing roll diameter, etc. Stable feeding speeds, simply accomplished, have long been desirable.

Also, there has been a continuing need for providing a tape transport apparatus characterized by a relatively simple means for driving the tape at both high and low speeds in both directions with mechanism which introduces little or no perturbations to the moving tape as might cause the recording and playback transducer of the transport to generate objectionable signals transduced by the record and playback transducer.

Accordingly, there has been a continuing need for a tape transport apparatus incorporating extremely simple means for operating selectively at either low speed or high speed.

SUMMARY OF THE INVENTION AND OBJECTS

In general, as provided herein, a tape transport apparatus employs a length of pliable record tape wrapped to form supply and take-up rolls and an annular, rotatable, resilient body for engaging the rolls and driving them selectively at high and low speeds. A rotatable drive spindle engages the annular, resilient body and rotates it at a first speed while engaging the periphery of the body. A shaft extends coaxially from the body for rotating the body at a second speed. A continuously rotating drive means, movable between advanced and retracted positions selectively couples the spindle or shaft to the drive means and serves to rotate the body at either a first or second speed. Finally, means for selectively moving the drive means between its advanced and retracted positions are provided to select one or the other of the drive speeds.

In general, it is an object of the present invention to provide an improved tape transport apparatus and particularly one which includes improved means for shifting from low to high speed and vice versa and for maintaining tape speed in a reliably controlled mode.

It is another object of the invention to provide a tape transport apparatus wherein a flywheel or other large mass can be quickly and simply coupled and decoupled to an annular drive body so as to selectively provide low kinetic energy in the transport system so as to permit quick stops and starts of the tape by decoupling the flywheel and maintaining high kinetic energy when the flywheel is coupled into rotating the drive body.

It is another object of the invention to provide an improved drive means for a tape transport apparatus characterized by a flywheel having an axis of rotation which can be displaced from one location to another to effect coupling of one or the other of two driving members to rotate the drive body via the flywheel in each instance.

The foregoing and other objects of the invention will become more readily evident from the following detailed description of a preferred embodiment when considered in conjunction with the accompanying drawings.

BRIEF DESCRIPTION OF THE DRAWINGS

FIG. 4 shows a diagrammatic top plan view in section taken along the line 4—4 of FIG. 5;

FIG. 5 shows a diagrammatic side elevation view with portions broken away for clarity taken along line 5—5 of FIG. 3;

FIG. 7 shows an enlarged detail in perspective.

DETAILED DESCRIPTION OF A PREFERRED EMBODIMENT

Figure 1:
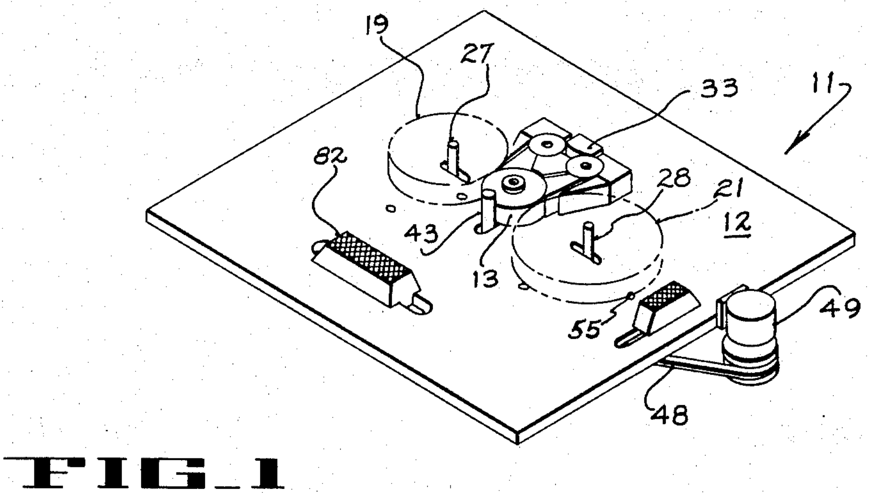
FIG. 1 shows a diagrammatic perspective view with portions broken away of a tape transport apparatus according to the invention.
Figure 2:
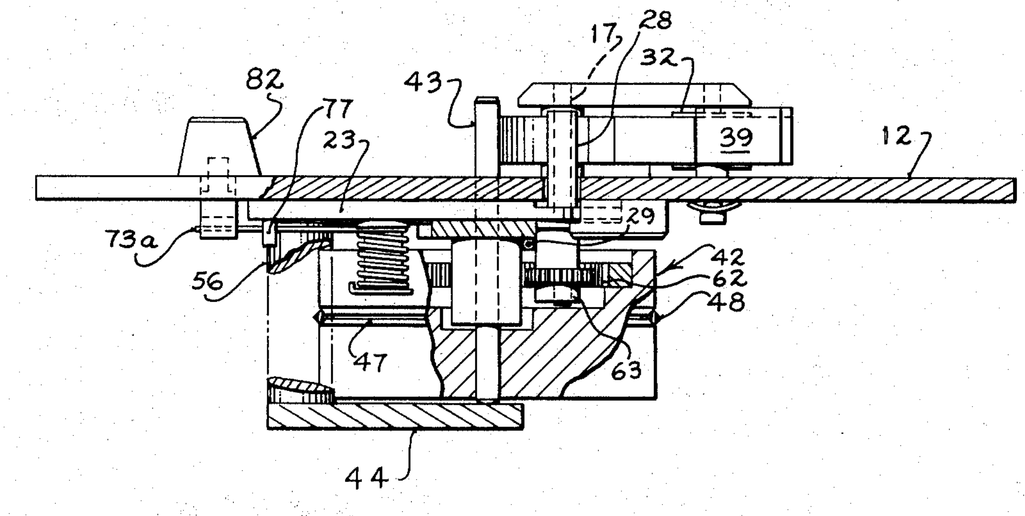
FIG. 2 shows a diagrammatic side elevation view of the apparatus of FIG. 1 viewed along line 2—2 of FIG. 3 with portions broken away for clarity.

The tape transport 11 includes a generally, planar deck or frame 12 upon which there is supported an annular, resilient, rotating drive body in the form of the idler or capstan 13 comprised of a resilient tire 14 disposed upon the hub 16 mounted upon a shaft 17. Deck 12 includes suitable bearings so as to mount shaft 17 for rotation as it extends through deck 12. The lower end of shaft 17 carries a relatively small diameter gear 18.

As described further below, shaft 17 and gear 18 may be selectively used to rotate capstan 13 as it rides in direct engagement with the periphery of each of rolls 19, 21 forming respectively the supply and take-up rolls of the transport.

Means are provided whereby rolls 19, 21 advance and retreat with respect to the periphery of capstan 13 so as to be maintained in contact therewith throughout the feeding of tape from one roll to the other. Accordingly, a pair of swing arms 22, 23 form carriages mounted to rotate about their respective pivot points 24, 26 whereby mounting posts 27, 28 can carry rolls 19, 21 respectively to advance and retreat with the feeding of tape from one roll to the other. Swing arms 22, 23 are formed with an arcuate end to ride upon a bearing shoulder 25 of a stationary member 30. Rolls 19, 21 are maintained in contact against the periphery of capstan 13 by means of the spring 29 coupled to each of arms 22, 23 whereby (in conjunction with means described below for tensioning the tape) rotation of capstan 13 rotates rolls 19, 21.

For feeding tape from supply roll 19 to take-up roll 21, the tape is trained about a pair of guide rolls 31, 32 disposed in flanking relation to a transducer assembly 33 thereby defining a span 34 of tape extending between rolls 31, 32. Tape is also guided along the channels 36, 37 defined between a mounting block 38 and one or the other of a pair of peeling members 39 each formed with a relatively sharp peeling blade 41. The peeling blades 41 ride between the outer periphery of the rolls 19, 21 and the tape being peeled or wrapped upon such roll. Means for driving capstan 13 further includes a flywheel assembly 40 comprising a cup-shaped flywheel 42 mounted to rotate with a drive spindle 43 journalled for rotation at its lower end in a support plate 44 and at its upper end journalled through a bearing assembly 46.

Flywheel 42 includes a V-shaped groove 47 whereby a square-shaped drive belt 48 coupled to the motor 49 at the side of deck 12 rotates flywheel 42.

Means for normally urging spindle 43 into engagement with the periphery of capstan 13 comprises a carriage assembly 51 supporting flywheel 42 for pivotal movement in an arc struck from the pivot axis defined by the journalled pivot connection 52.

Carriage assembly 51 includes a cleaver-shaped top plate 53 coupled to support plate 44 by means of a pair of downwardly extending posts 54, 56 fastened, as by means of screws 57, to top plate 53 at the openings 58. Finally, a spring 59 is coupled at one end to the end of top plate 53 and at its other end to a pin 61 fixed to deck 12. In this manner, top plate 53, support place 44 and flywheel 42 are normally urged, unless relieved, to dispose spindle 53 into driving relation with the periphery of capstan 13.

In this mode of operation, capstan 13 is rotated at a speed corresponding to the normal playing speed of the transport and flywheel 42 acts as a large drive gear, driven by belt 48, to rotate spindle 43 to drive capstan 13. Flywheel 42 also serves as a drive gear for rotating capstan 13 via its own supporting shaft 17 so as to rotate capstan 13 at a greater rate.

Accordingly, an annular disposition of gear teeth 62 is formed within the upper open end of flywheel 42 for cooperation with an idler gear 63 interposed between gear teeth 62 and gear 18 carried on the lower end of shaft 17. A journal body 64 secured to depend downwardly from the underside of deck 12 supports shaft 17 for rotation. Gear 18 and idler gear 63 remain continuously in mesh as the mounting stud 66 secures gear 63 in a freely rotatable manner beneath body 64. The pivotal positioning of flywheel assembly 40 about pivot 52 determines whether idler 63 engages teeth 62 (to drive shaft 17 at high speed) or whether idler 63 is disengaged sufficiently to cause spindle 43 to be directly driven by flywheel 42 (so as to operate capstan 13 at low speed).

As thus arranged, the drive gear member (formed by means of flywheel 42) either rotates spindle 43 in driving capstan 13 or rotates shaft 17 in a direct drive high speed mode of operation by means of gears 18, 62, 63, depending upon the location of the axis of rotation of flywheel 42.

Thus, means are provided for shifting the knob 69 and moving it in the direction against the tension of spring 59 so as to pivot top plate 53 about pivot 52 and in this manner carry the axis of rotation of flywheel 42 in the direction of arrow 71. By this movement, spindle 43 is immediately disengaged from the periphery of capstan 13 while flywheel 42 continues to rotate in the predetermined direction as determined by the direction of operation of motor 49.

Movement of the axis of rotation of flywheel 42 in an arc struck from pivot 52 ultimately provides engagement between the internal gear 62 with idler 63, which, in turn, is riding in mesh with gear 18 so as to continue the rotation of capstan 13 in the same prior direction as previously established but at a higher gear ratio so that the rate of rotation of capstan 13 is substantially increased.

Means supporting the outer end 53*a* of top plate 53 urges the top surface of plate 53 with confronting sliding contact with the underside of deck 12 and comprises an elongate slot 60 through the arm portion 53*a* and the stationary support post 55 carried by deck 12 to depend through slot 60. A coil spring 70 retained by washer 80 on the bottom of post 55 urges arm 53a against the bottom surface of deck 12.

Thus, flywheel assembly 40 moves with the arcuate movements of arm 53*a* to carry assembly 40 between advanced and retracted positions. The mass of flywheel 42 adds substantial momentum to the tape being fed. As disclosed herein, however, as tape is fed at high (or low) speed, it can be quickly decelerated by first decoupling the mass of flywheel 42 from the system. At that point, the momentum of the system can be quickly overcome and the tape arrested.

Accordingly, an intermediate decoupled position of knob 69 serves to decouple both spindle 43 and shaft 17 from flywheel 42 for rapid deceleration of the tape.

Finally, means are provided for applying a limited tension to the span 34 of tape at transducer 33. Each of springs 72, 73 is supported about a hollow post 74, 75 fixed to arms 22, 23 and depending downwardly from beneath deck 12. Each of springs 72, 73 includes an elongate, free tailpiece 72*a*, 73*a*, respectively, extending generally along the tail end of arms 22, 23. Each tailpiece 72*a*, 73*a* engages an associated pin 76, 77 carried in the end of arms 22, 23, respectively, so as to drive the arms about their pivot pins 24, 26 in a direction to carry rolls 19, 21 into contact with tire 14 of capstan 13. The coiled ends 72*b*, 73*b* of each of springs 72, 73 are respectively anchored in suitable style to their respective posts 74, 75.

Means are provided whereby one or the other of the two tailpieces 72*a*, 73*a* is relieved from acting against its cooperating pin 76, 77 so that the force of one or the other of springs 72, 73 combines with the otherwise balanced or equal forces supplied by spring 29 thereby increasing the force applied at the interface between the take-up roll and tire 14.

Tape can be fed in either direction and rolls 19, 21 previously referred to as "supply" and "take-up" rolls can reverse their functions so that roll 19 becomes the "take-up" roll and roll 21 becomes the "supply" roll simply by shifting the control bar 79 and reversing the drive motor.

Figure 3:
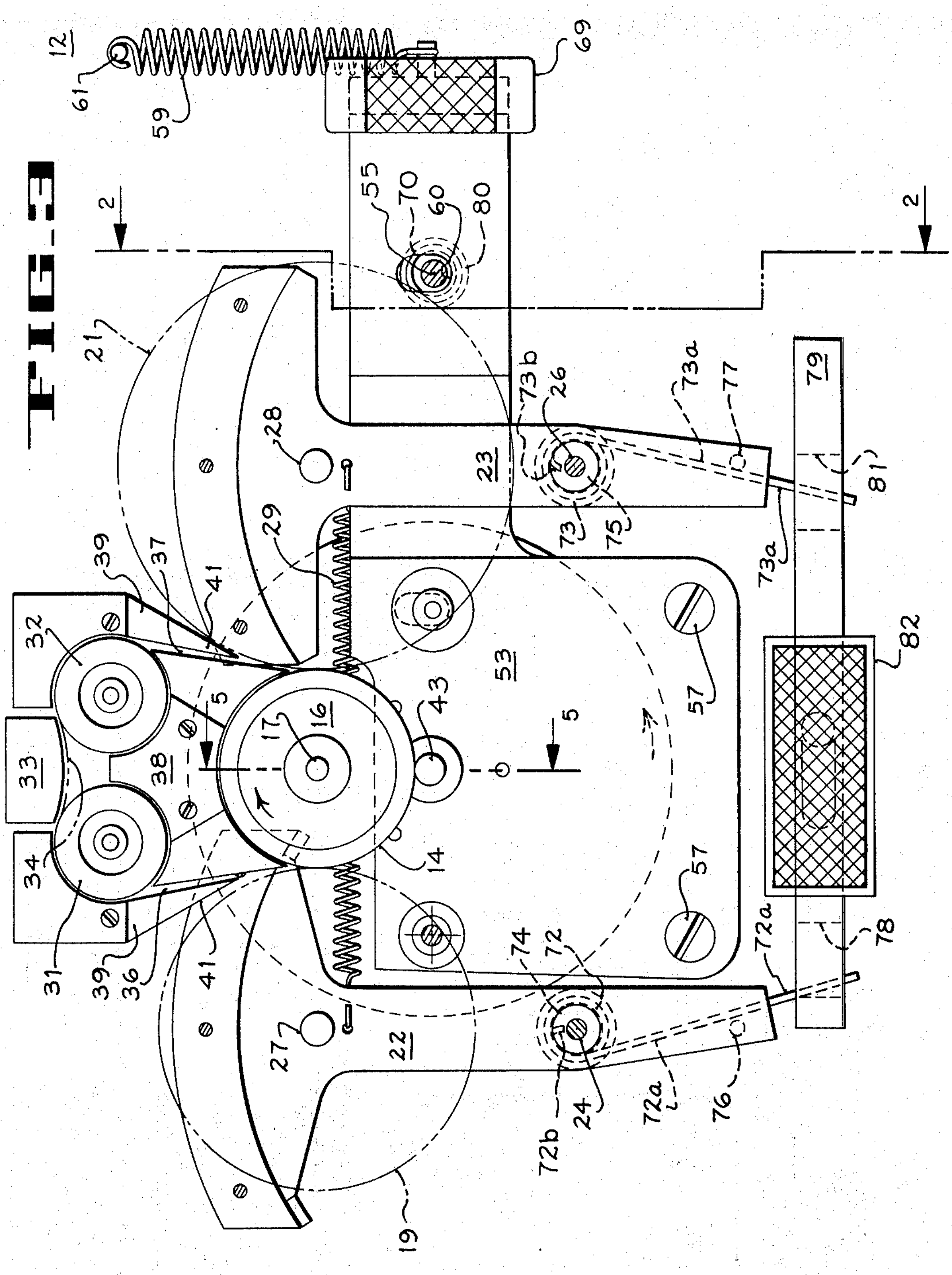
FIG. 3 shows a diagrammatic top plan view of apparatus according to the invention.
Figure 6:
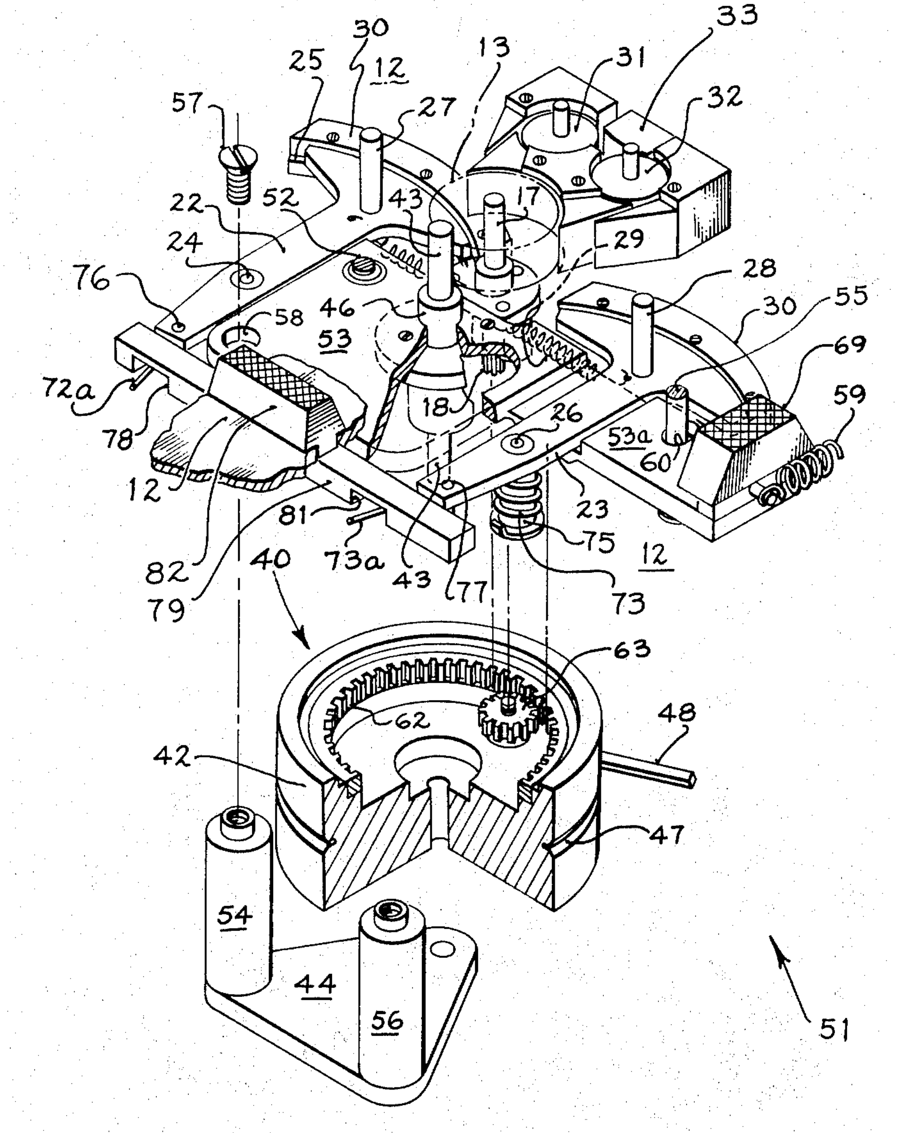
FIG. 6 shows an enlarged, exploded, diagrammatic, perspective view of apparatus according to the invention.

Control bar 79 serves to automatically reverse and control the tensioning of tape when feeding it in either forward or reverse. Accordingly, tailpiece 72*a* extends through a slot 78 formed in the underside of the laterally movable control bar 79 while tailpiece 73*a* extends through a slot 81. A thumb slide 82, operable from the top side of deck 12, serves to move bar 79 between advanced and retracted positions for feeding tape in a forward or reverse direction. Thus, in one position of slide 82, for example, as shown in FIG. 3, one of the tailpieces, such as 72*a*, will engage the side edge of slot 78 and thereby be relieved from contact with pin 76 while the other tailpiece, such as 73*a*, will be unfettered by the side edges of slot 81 and permitted to act fully against its pin 77.

In this manner, only tailpiece 73*a* will be operable to drive a swing arm (and its associated roll of tape 21) against tire 14 so as to create tension in the tape by applying a greater compressive force at the take-up side than on the supply side using principles as disclosed and elaborated upon more fully in U.S. Pat. No. 3,370,803 and U.S. Pat. No. 3,370,804.

Reversing the direction of movement of slide 82 and bar 79 reverses the situation whereby the righthand edge of slot 81 engages tailpiece 73*a* to move it out of contact with its associated pin 77 while permitting tailpiece 72*a* to act fully upon its associated pin 76 thereby driving roll 19 harder against tire 14 than roll 21 is driven against tire 14 so as to reverse the applied tension.

As noted above, means are provided for coupling flywheel 42 into driving relation with capstan 13 to operate at either high or low speeds. Intermediate positioning of the axis of rotation of flywheel 42 merely serves to decouple all driving forces from capstan 13 whereby the transport system has low kinetic energy and can be quickly and easily stopped while retaining the advantages of the flywheel in the system.

From the foregoing, it will be readily evident that there has been provided a tape transport apparatus of the kind described utilizing a continuously rotating drive means simply movable between advanced and retracted positions for selectively coupling either the spindle 43 or shaft 17 to the drive means so as to rotate capstan 13 at one or the other of two speeds in response thereto.

It is to be observed that the spindle and the shaft both rotate in the same direction in driving relation to the capstan to rotate the capstan in the same direction. It is a simple matter while the capstan is rotating slowly or fast in one direction to couple the drive means to one or the other of the spindle or capstan shaft. Accordingly, simply laterally shifting the axis of rotation of the flywheel (which also forms the drive gear with its internal teeth), coupling and decoupling is effected.

I claim:

1. In a tape transport apparatus of a type employing a length of pliable record tape wrapped to form supply and take-up rolls, an annular, rotatable, resilient body for engaging said rolls and for driving same selectively at high and low speeds, a rotatable drive spindle for engaging said body and rotating same at a first speed, a shaft extending coaxially of said body for rotating said body at a second speed, continuously rotating drive means movable between advanced and retracted positions for selectively coupling said spindle or said shaft to said drive means to rotate said body at said first or second speed in response thereto, and means for selectively moving said drive means between said advanced and retracted positions.

2. In a tape transport apparatus according to claim 1 wherein said spindle and said shaft rotate in the same direction in driving relation to said body to rotate said body in the same direction.

3. In a tape transport apparatus according to claim 1 wherein said drive means includes a flywheel rotatable about a laterally shiftable axis of rotation, said flywheel being formed to include an annular disposition of teeth thereof, and means carried by said shaft for selectively engaging said teeth in response to shifting of said axis.

4. In a tape transport apparatus of a type employing a length of pliable record tape wrapped to form supply and take-up rolls, an annular rotatable resilient body for engaging said rolls and driving same selectively at high and low speeds, a rotatable drive spindle for engaging said body and rotating same at a first speed, a shaft extending coaxially from said body for rotating said body at a second speed, a drive gear coupled to rotate said spindle, means for rotating said drive gear to rotate said body, means for shifting the axis of rotation of said gear to couple said gear to selectively drive said body at said first speed via said spindle or to rotate said shaft at said second speed via said shaft.

5. In a tape transport apparatus according to claim 4 further including a flywheel formed to include said gear, said means for rotating said drive gear further serving also to rotate said flywheel.

6. In a tape transport apparatus of a type employing an elongate pliable record tape wrapped to form supply and take-up rolls and a capstan engaging the tape to feed tape from one roll to the other and return, rotating drive means including a flywheel for driving said capstan, means supporting the axis of rotation of said flywheel for lateral movement between first and second positions to couple said flywheel in driving relation to said capstan to feed tape in one direction when in said first position, and when in said second position serving to selectively decouple said flywheel from said capstan to remove the momentum of the flywheel from the system for rapid deceleration of the tape.

* * * * *